US009330718B2

(12) United States Patent
Middleton et al.

(10) Patent No.: US 9,330,718 B2
(45) Date of Patent: May 3, 2016

(54) TECHNIQUES FOR ADDING INTERACTIVE FEATURES TO VIDEOS

(71) Applicant: Intel Corporation, Santa Clara, CA (US)

(72) Inventors: Daniel C. Middleton, Independence, MN (US); Oscar Nestares, San Jose, CA (US); Lucas B. Ainsworth, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 14/106,136

(22) Filed: Dec. 13, 2013

(65) Prior Publication Data

US 2014/0233915 A1    Aug. 21, 2014

Related U.S. Application Data

(60) Provisional application No. 61/766,827, filed on Feb. 20, 2013.

(51) Int. Cl.
*G11B 27/00* (2006.01)
*G11B 27/031* (2006.01)

(52) U.S. Cl.
CPC ................... *G11B 27/031* (2013.01)

(58) Field of Classification Search
CPC ....................................................... G11B 27/31
USPC ......... 348/164, 87, 222.1, 607; 386/278, 282; 382/164, 173
See application file for complete search history.

(56) References Cited

U.S. PATENT DOCUMENTS

| 7,420,590 | B2 * | 9/2008 | Matusik et al. | 348/159 |
| 7,692,664 | B2 | 4/2010 | Weiss et al. | |
| 2006/0221248 | A1 * | 10/2006 | McGuire et al. | 348/587 |
| 2007/0070200 | A1 * | 3/2007 | Matusik et al. | 348/159 |
| 2010/0254598 | A1 * | 10/2010 | Yang et al. | 382/164 |
| 2012/0023456 | A1 | 1/2012 | Sun et al. | |
| 2014/0002746 | A1 * | 1/2014 | Bai et al. | 348/607 |
| 2014/0003719 | A1 * | 1/2014 | Bai et al. | 382/173 |

OTHER PUBLICATIONS

Wikipedia, the free encyclopedia,"Cinemagraph", Creative Commons Attribution-ShareAlike License, Mar. 5, 2014, 1 Page. Webpage available at: http://en.wikipedia.org/wiki/Cinemagraph.

* cited by examiner

*Primary Examiner* — Thai Tran
*Assistant Examiner* — Mishawn Hunter
(74) *Attorney, Agent, or Firm* — Finch & Maloney PLLC

(57) ABSTRACT

Techniques are disclosed for adding interactive features to videos to enable users to create new media using a dynamic blend of motion and still imagery. The interactive techniques can include allowing a user to change the starting time of one or more subjects in a given video frame, or only animate/play a portion of a given frame scene. The techniques may include segmenting each frame of a video to identify one or more subjects within each frame, selecting (or receiving selections of) one or more subjects within the given frame scene, tracking the selected subject(s) from frame to frame, and alpha-matting to play/animate only the selected subject(s). In some instances, segmentation, selection, and/or tracking may be improved and/or enhanced using pixel depth information (e.g., using a depth map).

25 Claims, 8 Drawing Sheets

TECHNIQUES FOR ADDING INTERACTIVE FEATURES TO VIDEOS

RELATED APPLICATION

This application claims the benefit of U.S. Provisional Application No. 61/766,827, filed on Feb. 20, 2013, which is herein incorporated by reference in its entirety.

BACKGROUND

Still images and video each have benefits and limits to how they are able to depict an event in time. They also both have defined limits to interactions with the media. Typically they are engaging for the creator but passive for the audience. For example, after a video is created, the user can typically only passively navigate (e.g., play, rewind, forward, pause, and stop) through the frames of the video as originally intended by the creator and there is no opportunity for the user to interact with the video. A similar limitation equally applies to still images. In this sense, video and still images do not invite user input.

DETAILED DESCRIPTION

Figure 1A:
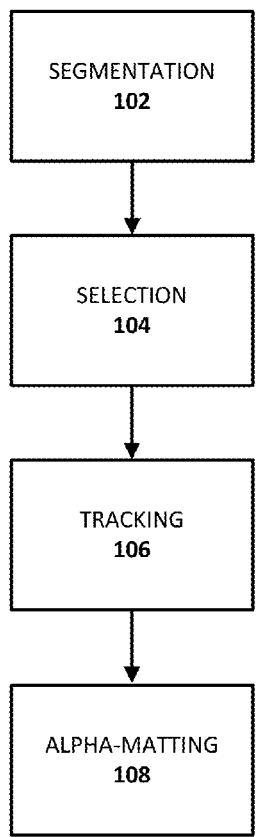
FIGS. 1a-c show three methods illustrating techniques for adding interactive features to videos, in accordance with one or more embodiments of the present disclosure.

Techniques are disclosed for adding interactive features to videos to enable users to create new media using a dynamic blend of motion and still imagery. The interactive techniques can include allowing a user to change the starting time of one or more subjects in a given video frame, or only animate/play a portion of a given frame scene. The techniques may include segmenting each frame of a video to identify one or more subjects within each frame, selecting (or receiving selections of) one or more subjects within the given frame scene, tracking the selected subject(s) from frame to frame, and alpha-matting to play/animate only the selected subject(s). In some instances, segmentation, selection, and/or tracking may be improved and/or enhanced using pixel depth information (e.g., using a depth map). Numerous variations will be apparent in light of this disclosure.

General Overview

As previously explained, still images and video have defined limits, and they are both typically engaging for the creator but passive for the audience/viewer. At present, viewing a video generally only involves the ability to play, rewind, forward, pause, and stop all of the visual content at once. Currently, there are no simple and intuitive techniques for interacting with videos to play only portions of the video scene at a time or to alter the time/location of portions of the video, such that new visual media can be created where portions of the scene are out of sequence with the remainder of the scene.

Thus, and in accordance with one or more embodiments of the present disclosure, techniques are disclosed for adding interactive features to videos. Videos, as referred to herein, include a series of at least two still images/frames, such as a movie or a set of photos taken using a burst mode, for example. The entirety of a single frame will be referred to herein as the "scene," whereas objects or areas of interest within the scene of the frame (such as people, animals, various items, background or background sections, etc.) will be referred to herein as "subjects." The interactive features resulting from the techniques described herein include being able to create the following new media from a video: 1) a new still image with one or more subjects of the video at different moments in time (or from different frames) than the rest of the scene; 2) a new video artifact with one or more subjects started out of sequence; and 3) a new visual media artifact where one or more subjects are playing, but the remainder of the frame scene stays still (similar to cinemagraphs). Thus, in one or more embodiments, the interactive features involve creating a dynamic blend of motion and still imagery in a displayed scene. The new media may be saved and/or shared in either a dynamic form (e.g., where further interacting is possible) or static form (e.g., where further interaction is not possible), as will be discussed in more detail below.

In some embodiments, the techniques used to add the interactive features described herein may involve at least the following: segmentation, selection, tracking, and alpha-matting. As will be appreciated in light of this disclosure, the order of the functions may be varied. Segmentation may include segmenting each frame of a video into its semantic components to identify one or more subjects within each frame scene based on a respective group of pixels, using, for example, an unattended graph cut method or other suitable method. In some instances, segmentation may be completely automated; however, in other instances, segmentation may be semiautomatic or may be manually performed. Selection may include clicking on (e.g., in the case of mouse input) or touching/tapping on (e.g., in the case of touch sensitive input) one or more of subjects in a presented frame of a video. In some embodiments, segmentation, selection, and/or tracking may be improved using pixel depth information (e.g., a depth map) for each frame of the video. In some such embodiments, the depth information may be generated using a stereo or array camera, as will be discussed in more detail below. Note that in some embodiments, selection may occur prior to segmentation, which may help to refine and/or improve the segmentation process.

Tracking may include tracking the selected subject from frame to frame of the video to identify the respective group of pixels comprising the selected subject(s) in each frame. Alpha-matting may be performed using a number of methods. One such example method includes forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played. Another example method includes forming a transparency matter around the one or more selected subjects in each frame to allow playing the video by copying the one or more selected subjects in the frame being played on top of the given frame scene. Other suitable alpha-matting methods will be apparent in light of this disclosure.

As previously described, the interactive features added to video using the techniques described herein may be used to create new visual media artifacts where one or more subjects are playing, but the remainder of the frame scene stays still. This example new media type is similar to a cinemagraph in terms of achieving animation in only a portion of a given frame scene and leaving the remaining given frame scene unchanged and still. However, the interactive features added to video using the techniques described herein provide multiple benefits over conventional cinemagraph creation methods. First, the interactive features described herein permit dynamic changes to the scene, whereas cinemagraphs are non-interactive immutable video loops. Second, the interactive features described herein can be added using fully or semi-automated techniques, whereas cinemagraph creation is primarily a manual process. Third, cinemagraphs use imprecise boundaries leading to undesired visual artifacts, which can be prevented or eliminated using the segmentation, tracking, and alpha-matting techniques described herein. Other benefits over conventional cinemagraph creation methods will be apparent in light of this disclosure.

In accordance with some embodiments, use of the disclosed techniques may be detected, for example, by visual inspection/evaluation of media including the interactive features described herein (e.g., the ability to only play a portion of a video). Use of the techniques disclosed herein may also be detected based on the resulting visual media produced. For example, images where only a portion of the scene are animated or videos where subjects are started out of sequence may have been produced using the techniques for adding interactive features to videos as variously described herein. Numerous variations and configurations will be apparent in light of this disclosure.

Methodology and Example Applications

Figure 1B:
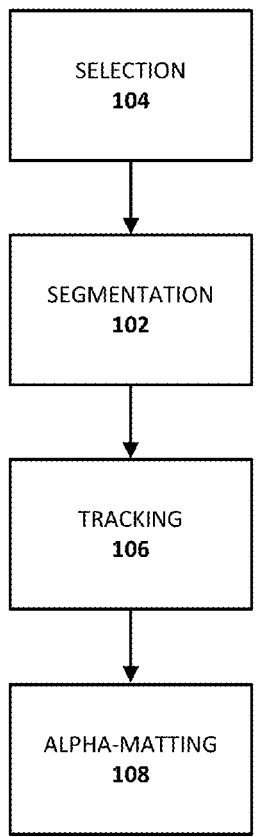
Figure 1C:
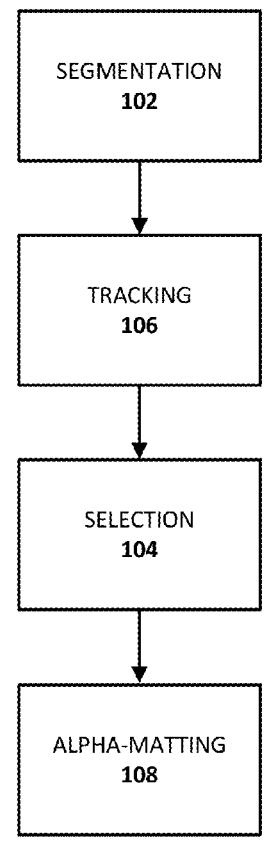

FIGS. 1a-c show methods 100a-c, respectively, illustrating techniques for adding interactive features to videos, in accordance with one or more embodiments of the present disclosure. FIGS. 2a-g' show example images that illustrate the techniques of FIGS. 1a-c, in accordance with some embodiments. As previously described, the techniques are primarily discussed herein in the context of adding interactive features to a video having multiple frames; however, the techniques need not be so limited. For example, the techniques illustrated of methods 100a-c can be used to add interactive features to a group of still images or to other visual media including a series of at least two still images/frames, as will be apparent in light of this disclosure. Methods 100a-c all include segmentation 102, selection 104, tracking 106, and alpha-matting 108, each of which will be discussed in more detail below.

Figure 2A:
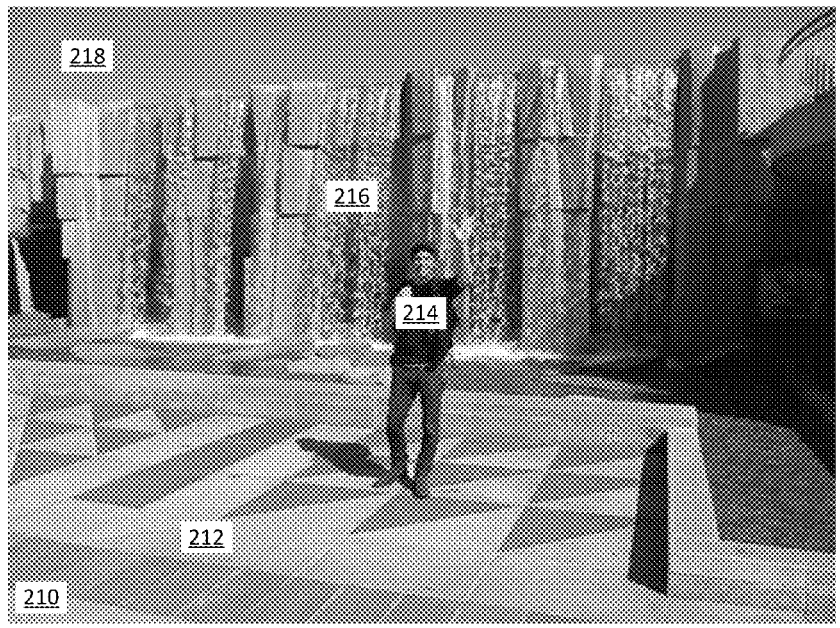
FIGS. 2a-g' show example images that illustrate the techniques of FIGS. 1a-c, in accordance with some embodiments.
Figure 2B:
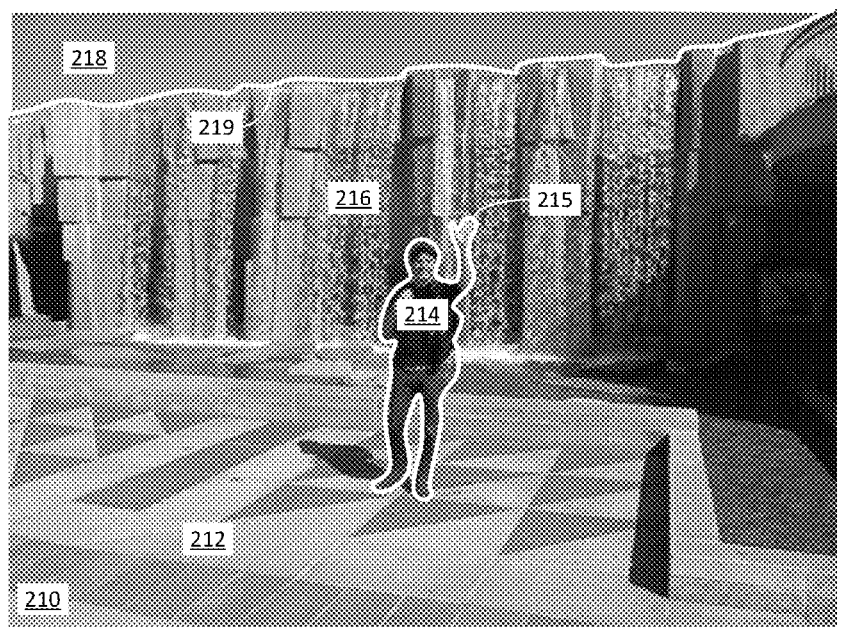

FIG. 2a illustrates an image/frame 210 of a man 214 standing in front of a waterfall 216, in accordance with an example embodiment. As can be seen, the man 214 is making a waving motion in this example frame. The foreground 212 and sky 218 are also shown in frame 210. FIG. 2b illustrates an example image after segmentation 102 has been performed to identify the man 214. Segmentation 102 can include segmenting a frame of a video into its semantic components to identify one or more subjects within each frame. Segmentation 102 can be performed using any known segmentation method, such as graph partitioning methods, clustering methods, thresholding, compression-based method, histogram-based methods, edge detection, region-growing methods, split-and-merge methods, partial differential equation (PDE)-based methods, a watershed method, or any other suitable method as will be apparent in light of this disclosure. In one example embodiment, segmentation 102 is performed using an unattended graph cut method. Segmentation 102 may be fully automated, semi-automated, or manual, depending upon the configuration and methods used.

In some embodiments, the one or more subjects may be segmented based on their respective group of pixels. For example, FIG. 2b shows the pixels that represent the man 214 wearing a backpack and waving (in frame 210) outlined by shape 215 and the pixels that represent the sky 218 outlined by shape 219. Note that only the subjects of the man 214 and the sky 218 are included as having been identified by an example segmentation process 102, such as an unattended (automatic) graph cut method. Other subjects within the frame 210 may include the waterfall section 216, the foreground 212, or any other suitable object or area of interest. As previously described, the one or more subjects may be identified automatically, semi-automatically, or manually, depending upon the segmentation 102 process used.

In some embodiments, segmentation 102 may be improved or enhanced using depth information for the frames of a video. Depth data may be provided or generated, for example, using a depth map of the frames. In some instances, each pixel may include RGB-D data, where RGB relates to the color of each pixel (red, green, blue color model) and the D relates to the depth information of each pixel. In some embodiments, depth information may be collected by the specific device capturing the video used in the techniques described herein. Such devices may include various stereo cameras, array cameras, light-field cameras, or other depth sensors or depth sensing technologies. In a specific example, an infrared projector and a monochrome complimentary metal-oxide semiconductor (CMOS) sensor (such as is used in the Microsoft® Kinect®) may be used to capture three dimensional video data, even under low-light conditions. In some embodiments, depth information may be estimated for an already existing video. For example, in some instances, the motion information of an already existing video may be used to estimate depth information. In some cases, the spatial and temporal information from consecutive frames of monoscopic video may be used to estimate depth information. Depth map estimation may be generated using automatic, semi-automatic, or manual techniques, depending upon the configuration and methods used.

Figure 2C:
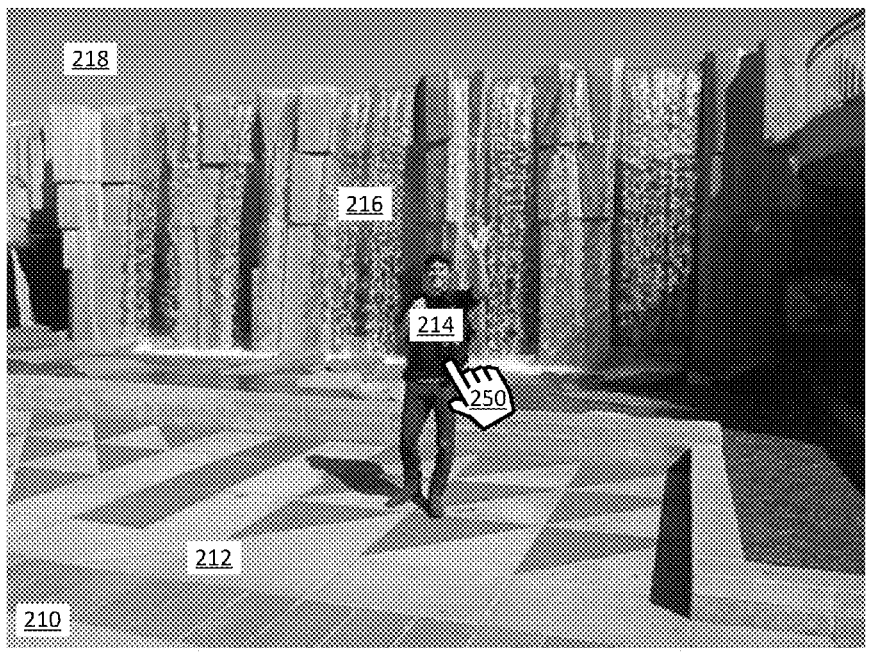
Figure 2D:
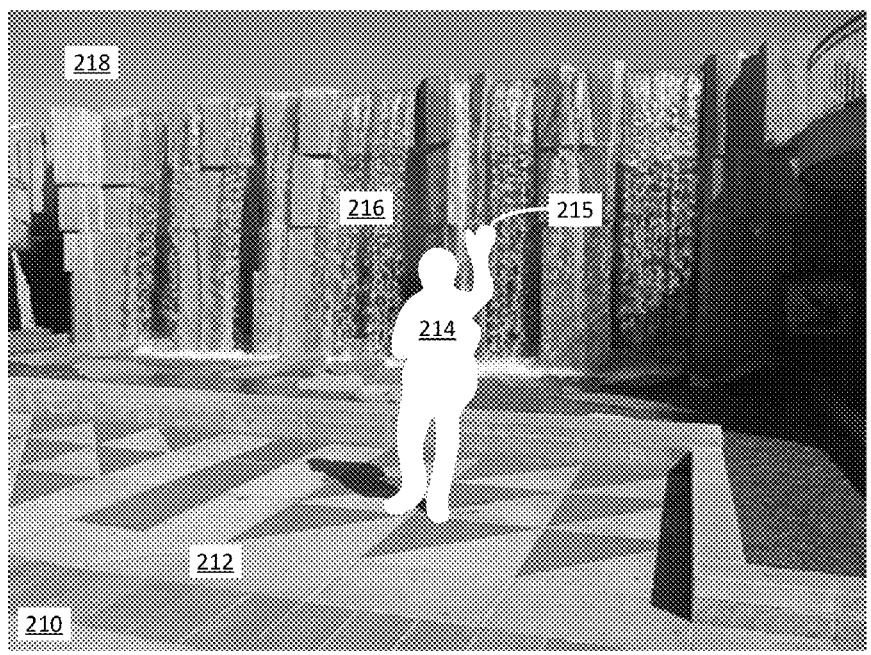

FIG. 2c shows an example selection 104 of a subject in a video frame, in accordance with an embodiment. More specifically, hand 250 is shown selecting the man 214 in frame 210. Selection 104 can include selecting one or more subjects within a given frame. In this manner, the methods 100a-c may be configured to receive selection 104 from a user, for example. Selection 104 can be performed using various input devices, such as clicking on the desired subject(s) using a mouse or trackpad, touching the desired subject(s) using a touch sensitive device (e.g., using an appropriately placed tap on a device having a touchscreen), or by any other suitable method, such as a gesture made by a person or a sound or spoken word from a person. FIG. 2d shows an example of frame 210 after the man 214 has been selected. As can be seen, the man 214 has been highlighted as a result of the selection of FIG. 2c. Note that in this embodiment, the shape of man 215 has already been identified by the segmentation 102 process. However, in other embodiments, segmentation 102 may not take place until after selection 104 has been performed, as will be discussed in more detail herein. In some embodiments, pixel depth information can be used to auto-select subjects (e.g., automatically select the foreground and the background in a given frame scene) or enhance selection (e.g., to enhance a user's selection of a group of pixels sharing the same or similar depth).

Figure 2E:
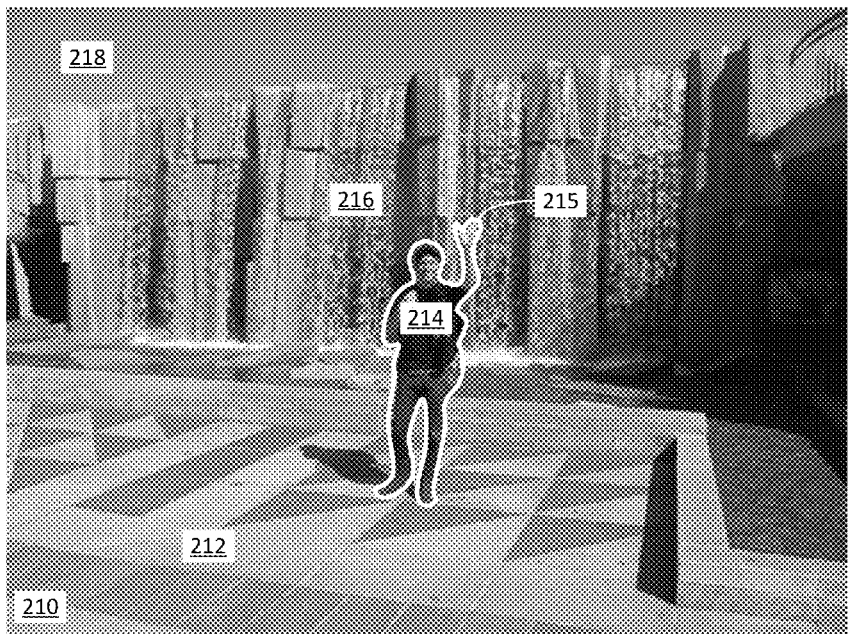
Figure 2F:
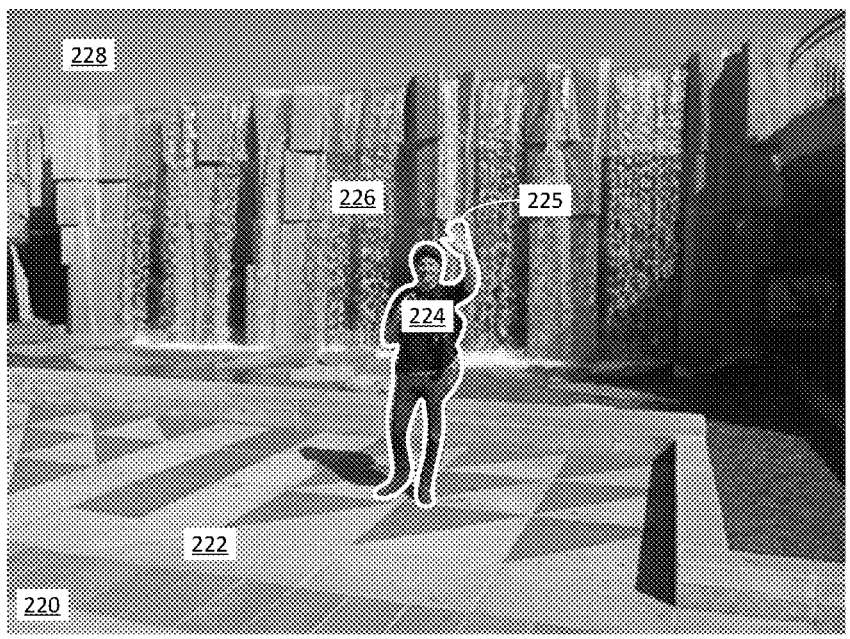

FIGS. 2e-f show an example of tracking 106 between a first frame 210 and a second frame 220, in accordance with an embodiment. Tracking 106 can include tracking the selected subject(s) from frame to frame of the video. In this example embodiment, first frame 210 and second frame 220 are a series of frames from a video. FIG. 2e shows the first frame 210 including the man 214 and his segmented outline 215, as has previously described. FIG. 2f shows the second frame 220 with numbers corresponding to those in the first frame 210 (e.g., 218 for the sky in the first frame and 228 for the sky in the second, etc.). The second frame 220 in this example embodiment includes the same man 224 from the first frame 210, except that his hand position has moved, since the man 214, 224 is waving as can be seen. Segmentation outline 225 shows the result of the new group of pixels that represent the man 224 after his left hand has changed position in the wave. Tracking 106 can include tracking the selected subject(s) from frame to frame to identify the correct set of pixels in each frame. For example, the man 214, 224 identified as pixel groups 215, 225 can be tracked from the first frame 210 to the second frame after segmentation 102 has been performed. In some embodiments, pixel depth information can be used to enhance tracking (e.g., using such depth information to increase the efficacy of identifying subjects from frame to frame).

As can be seen in FIGS. 1a-c, segmentation 102 can be performed before or after selection 104. In an example method 100a, segmentation 102 is performed, followed by selection 104 of one or more subjects, followed by tracking 106 the selected subject(s). In such an embodiment, performing segmentation 102 before selection 104 may reduce the delay between selection 104 and media playback. In another example method 100b, selection 104 of one or more subjects is performed, followed by segmentation 102, and then tracking 106. In such an embodiment, the selection 104 information (e.g., the selection coordinates) can be added as a refinement to the segmentation 102 process (e.g., adding the selection coordinates to an unattended graph cut algorithm). In another example method 100c, segmentation 102 is performed, followed by tracking 106, followed by selection 104 of one or more subjects. In such an embodiment, performing segmentation 102 and tracking 106 before selection 104 may reduce the delay between selection 104 and media playback. In example methods 100a-c, alpha-matting 108 is performed after segmentation 102, selection 104, and tracking 106 have been completed; however, that need not be the case, as will be apparent in light of this disclosure. In other example embodiments, the method may include multiple segmentation 102 and selection 104 processes before tracking 106 and alpha-matting are performed 108. For example, in such an embodiment, the method may include an auto-segmentation process, a user selection, and then a re-segment based on the selection input. Such an example sequence may be repeated until the user obtains a desired level of fidelity.

Figure 2G:
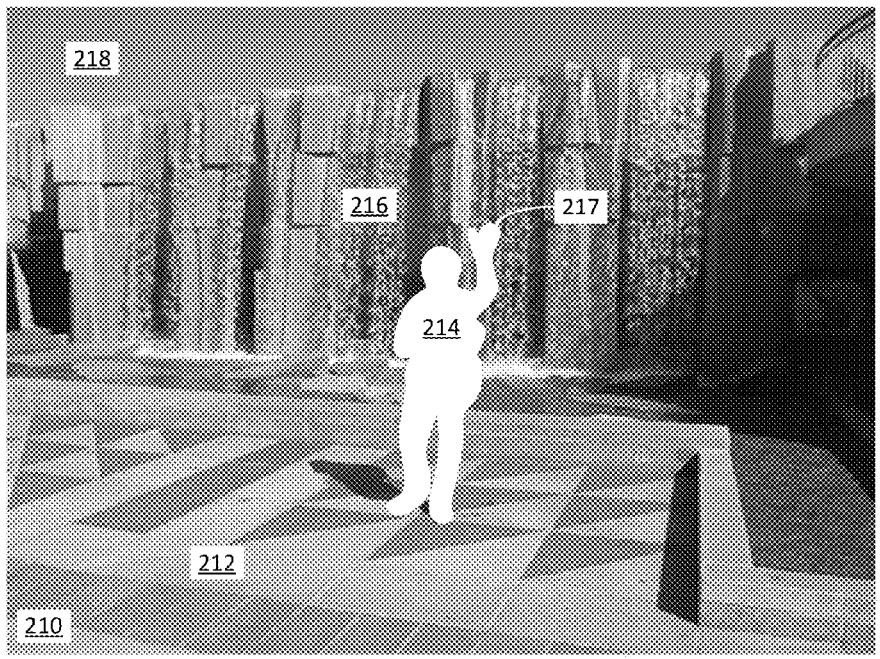
Figure 2G:
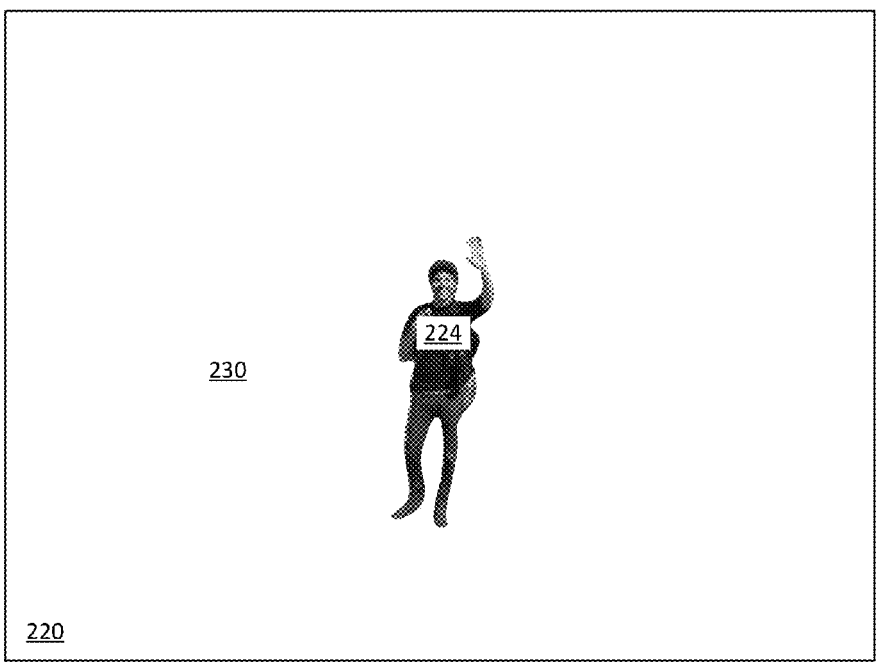

FIGS. 2g-g' show examples of alpha-matting 108 frame 210, in accordance with some embodiments. Alpha-matting 108 may include isolating the selected subject(s) from frame to frame to only animate the selected subject(s). For example, alpha-matting 108 may include either: 1) forming a transparency matte matching the shape of the selected subject(s) in the given frame scene to allow playing the video through a hole(s) created by the transparency matte, where the shape of the hole(s) in the given scene is updated for each frame of the video to match the shape of the selected subject(s) in the frame being played; or 2) forming a transparency matte around the selected subject(s) in each frame to allow playing the video by copying the selected subject(s) in the frame being played on top of the given frame scene. In other words, in an example alpha-matting 108 process, one or more holes that represent the shape of the selected subjects are cut in an initial/given frame of a video and the initial frame (with the holes) is stacked on top of each subsequent frame of the video to play the video through the holes, where the holes in the initial frame are updated on a frame-by-frame basis to match the shape of the selected subjects in the frame currently being played. In another example alpha-matting 108 process, the initial/given frame is once again the starting point, except that in this example process, the one or more selected subjects are isolated from each subsequent frame (e.g., by cutting out, removing, or making transparent the remaining scene of each subsequent frame) and then the selected subjects from the frame currently being played are copied on top of the initial frame on a frame by frame basis to play the video.

FIG. 2g shows an example of an image produced using an alpha-matting 108 method for original frame 210 (e.g., the frame where selection 104 was made). As can be seen, a hole 217 matching the shape of the man 214 (who was previously the only subject selected) was cut out from the original frame 210. The video can then be played through hole 217, and at each subsequent frame, the original frame 210 is reset and a new hole is created in original frame matching the selected subject (the man 214, in this case) of the current frame. The original image with the new hole cut out matching the current frame can then be laid over the current frame to play that frame. The hole cut-lay over process can continue for each successive frame (since such information has been tracked 106) to play the video.

FIG. 2g' alternatively shows an example image produced using another alpha-matting 108 method for original frame 210. In this alternative alpha-matting 108 method, the scene 230 surrounding the man 224 was cut out from subsequent frame 220 (frame 220 is outlined for purposes of illustration). The video can then be played by copying the image remaining after cutting out the scene 230 surrounding the shape of the man 224 onto the original frame 210. In this manner, only the selected subject (e.g., the man 224, in this case) is copied on top of the original frame to animate the selected subject when playing the video. The scene surrounding the subject cut-copy over the original frame can continue for each successive frame (since such information has been tracked 106) to play the video. Note that although only one subject (the man 214, 224) is being used in these examples of the alpha-matting 108 process, multiple subjects may be used. For example, if the sky 218 was selected as an additional subject to animate, in FIG. 2g, the sky 218 would also be cut out, and in FIG. 2g', the sky 228 would also be shown. Also note that in some embodiments, cutting out the selected one or more subjects (or the scene surrounding the selected one or more subjects) may constitute setting the selected one or more subjects (or the scene surrounding the selected one or more subjects) as transparent.

Example Media Creations

In accordance with one or more embodiments, the interactive features added to video (using the techniques described herein) can be used to create numerous types of media. The media may include: 1) a new still image with one or more subjects of the video at different moments in time (or from different frames) than the rest of the scene; 2) a new video artifact with one or more subjects started out of sequence; and 3) a new visual media artifact where one or more subjects are playing, but the remainder of the frame scene stays still (similar to cinemagraphs). These three examples, which are described in more detail below, are provided for illustrative purposes and are not intended to limit the present disclosure.

The first example new media that can be made using the interactive features added to video using the techniques described herein includes creating a new still image with one or more subjects of the video at different moments in time (or from different frames) than the rest of the scene. This may be achieved by selecting one or more subjects in a given frame to animate or play those subjects while the remaining scene in the given frame remains unchanged. In some embodiments, the interactive features may allow one or more subjects in a given frame to be animated/played and then stopped at a different frame. In some such embodiments, the interactive features may then allow a user to animate/play and then stop a different one or more subjects, so that at least two subjects can be at different frame locations relative to the remaining given frame scene. Therefore, in such embodiments, there may be three different video times/frame locations represented in a single still image.

The second example new media that can be made using the interactive features added to video using the techniques described herein includes creating a new video artifact with one or more subjects started out of sequence. This may be achieved by selecting one or more subjects in a given frame to animate or play, and then causing the remainder of the scene to be played. In some embodiments, the interactive features may allow one or more subjects in a given frame to be animated/played and then stopped at a different frame. In some such embodiments, the interactive features may then allow a user to animate/play and then stop a different one or more subjects, so that at least two subjects can be at different frame locations relative to the remaining given frame scene. Therefore, in such embodiments, the user may then be able to play the entire media where two or more subjects are out of sequence with each other and the two or more subjects are out of sequence with the remainder of the frame.

The third example new media that can be made using the interactive features added to video using the techniques described herein includes a new visual media artifact where one or more subjects are playing, but the remainder of the frame scene stays still. This may be achieved by selecting one or more subjects in a given frame to animate or play, while the remainder of the scene in the given frame remains unchanged. In some embodiments, the interactive features may allow one or more subjects in a given frame to be animated/played and then stopped on command. In some such embodiments, the interactive features may then allow a user to animate/play a different one or more subjects and stop those on command as well. Therefore, in such embodiments, the user may then be able to play the media where two or more subjects are out of sequence with each other and the two or more subjects are out of sequence with the remainder of the frame, but the remainder of the original frame remains unchanged and still.

The third example new media is similar to a cinemagraph in terms of achieving animation in only a portion of a given frame scene and leaving the remaining given frame scene unchanged and still. However, the interactive features added to video using the techniques described herein provide multiple benefits over conventional cinemagraph creation methods. First, the interactive features described herein permit dynamic changes to the scene, whereas cinemagraphs are non-interactive immutable video loops. Second, the interactive features described herein can be added using fully or semi-automated techniques, whereas cinemagraph creation is primarily a manual process. Third, cinemagraphs use imprecise boundaries leading to undesired visual artifacts, which can be prevented or eliminated using the segmentation, tracking, and alpha-matting techniques described herein. Other benefits over conventional cinemagraph creation methods will be apparent in light of this disclosure.

Figure 3A:
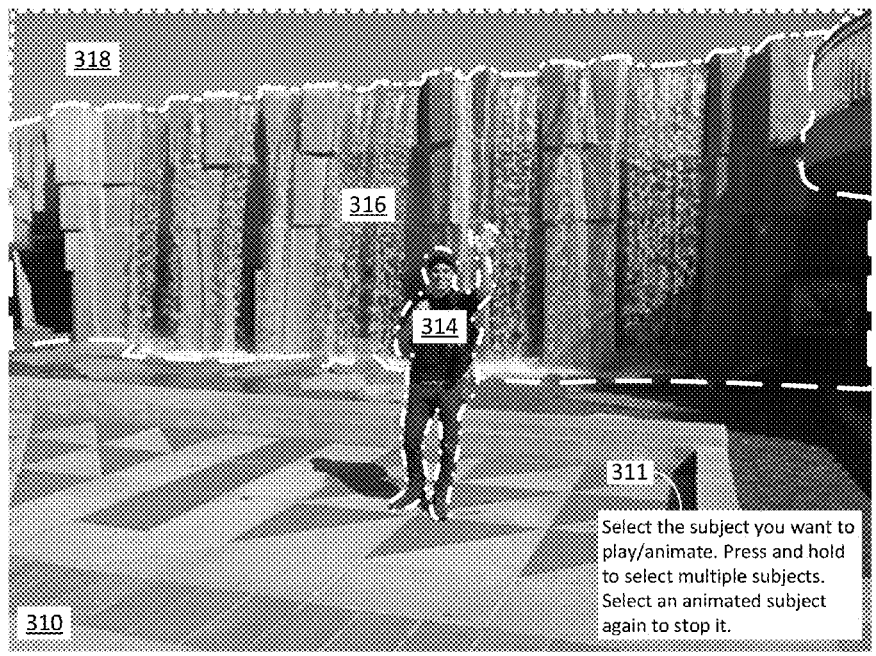
FIGS. 3a-b show screen shots illustrating an example user interface for interacting with media including the interactive features as described herein, in accordance with one or more embodiments.
Figure 3B:
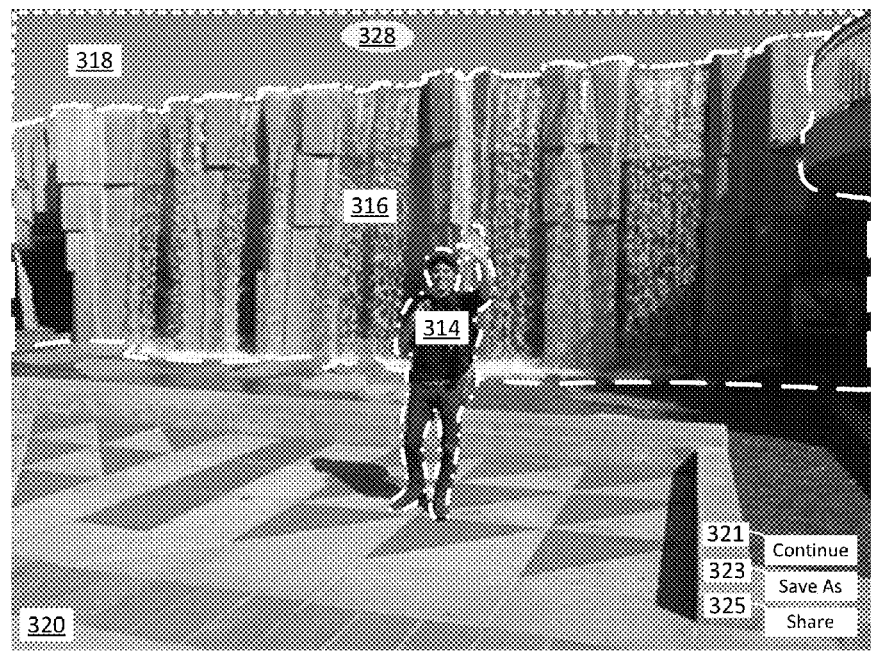

FIGS. 3a-b show screen shots illustrating an example user interface for interacting with media including the interactive features as described herein, in accordance with one or more embodiments. As can be seen in FIG. 3a, the user is presented with a first screen shot 310 of a video, which is similar to frame 210 discussed herein. For example, the three subjects previously discussed, the man 314, the waterfalls 316, and the sky 318, are still shown. The man 314 is shown having a dot and dash outline, the waterfalls 316 are shown having a long dash outline, and the sky 318 is shown having a short dash outline. In this example embodiment, the three subjects 314, 316, and 318 have already been segmented, selected, tracked, and alpha-matted, allowing a user to select one or more of them to play/animate the selected subject(s) relative to the remainder of the frame shown in the first screen shot 310. Instructions 311 are included in this example UI to notify the user to "Select the subject you want to play/animate," to "Press and hold to select multiple subjects," and to "Select an animated subject again to stop it." This example UI and corresponding instructions are provided for illustrative purposes are not intended to limit the present disclosure.

FIG. 3b shows a new media created after selecting the man 314 and the sky 318 to play/animate those two subjects relative to the scene surrounding those two subjects. As can be seen in second screen shot 320, animating the man 314 has caused his hand to wave to the new location shown and animating the sky has caused a cloud 328 to appear. The entirety of the scene shown in second screen shot 320 has been stopped for ease of discussion, which may have been performed by individually selecting subjects 314 and 318 while they are animating or through some other suitable command (e.g., using a stop all button or hitting a space bar). However, the subjects may be animated and stopped by a user one at a time, such that subjects may be moving and/or stopped out of sequence from other subjects and from the remainder of the scene. A continue button 321 is provided to allow the user to continue to play/animate the previously selected subjects. In some instances, the interactive features may be configured to allow a user to select one or more of the subjects before continuing animation to stop, play and/or reset the subject(s). Various features may be included to notify the user as to which subjects are available for selection, which subjects are currently selected to play/animate, which subjects are currently selected to be stopped/not animate, which subjects are out of sequence (e.g., using frame indicators to show what frame the subject is currently playing from), or other information that may assist the user with using the interactive features as variously described herein.

In some embodiments, the new media created using the interactive features added to video as variously described herein may be saved and/or shared (exported, emailed, uploaded, etc.) in a dynamic or static format. Dynamic sharing may include sharing the particular media type, whether it be a created still image, video artifact, or cinemagraph-like artifact, in a manner where recipients of the media or subsequent viewers can further interact with the media (e.g., by changing the starting sequence of one or more subjects). Static sharing may include sharing the media as it was created. For example, a still image representing different moments in time in a video than had naturally occurred may be shared as a joint photographic expert group (JPEG) file or portable network graphics (PNG) file, just to name two common formats. In the example case of creating a video where parts of the video are out of sequence, the new media may be shared as a moving picture experts group (MPEG) file or an audio video interleaved (AVI) file, just to name two common formats. In the example case of creating a new visual media artifact where only a portion of the frame is animated/playing, the new media may be shared as a graphics interchange format (GIF) file, just to name a common format. In the example shown in FIG. 3b, the new media may be saved as a dynamic or static file, or it may be shared (exported, emailed, uploaded, etc.) as a dynamic or static file, by selecting the respective buttons 323, 325.

Example System

Figure 4:
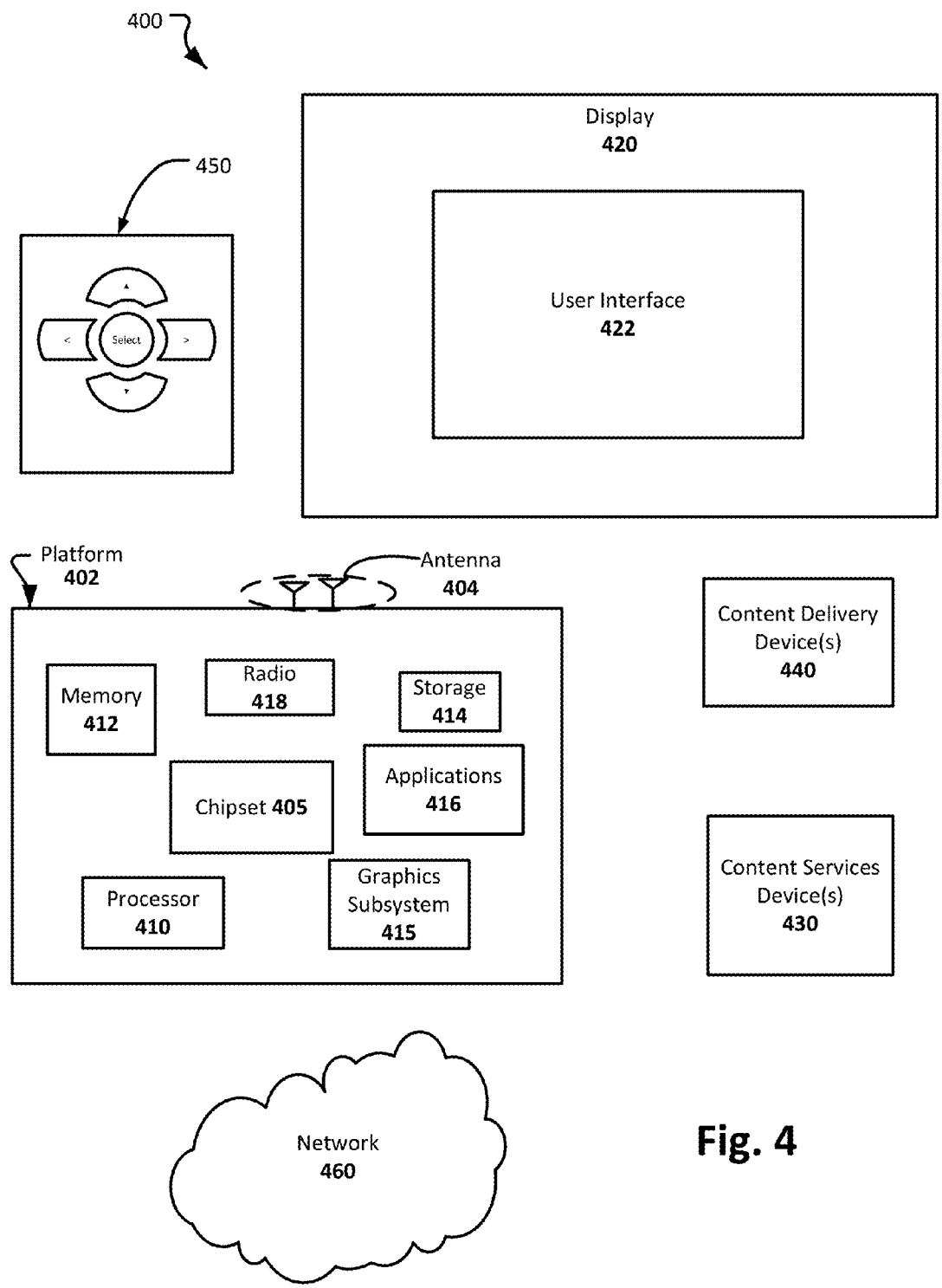
FIG. 4 illustrates an example system that may carry out the techniques for adding interactive features to video as described herein, in accordance with one or more embodiments.

FIG. 4 illustrates an example system 400 that may carry out the techniques for adding interactive features to video as described herein, in accordance with one or more embodiments. In some embodiments, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 400 comprises a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these example components is described in more detail below.

In some embodiments, platform 402 may comprise any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 410 may comprise dual-core processor(s), dual-core mobile processor(s), and so forth. Memory 412 may be implemented, for instance, as a volatile memory device such as, but not limited to, a Random Access Memory (RAM), Dynamic Random Access Memory (DRAM), or Static RAM (SRAM). Storage 414 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 414 may comprise technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405. The techniques for adding interactive features to video as variously described herein may be implemented in various hardware architectures. For example, segmentation 102, selection 104, tracking 106, and alpha-matting 108 may all be performed or received by a single module (e.g., a CPU), while in other instances, such processes may be performed in separate modules (e.g., segmentation 102 is performed in the cloud, selection 104 is received from touch screen input, and tracking 106 and alpha-matting 108 are performed locally on the user's computer, or some other variation as will be apparent in light of this disclosure). In some embodiments, the techniques for adding interactive features to video may be implemented by discrete processors designated for such a purpose or by one or more general purpose processors (including multi-core processors) that can access and execute software embodying the techniques. In addition, in some embodiments, the segmentation 102, selection 104, tracking 106, and alpha-matting 108 may be stored in one or more modules including, for example, memory 412, storage 414, and/or applications 416. In one such example case, the techniques are coded into an image processing application included in the applications 416, wherein the application is executable on processor 410. Note that the image processing application may be loaded directly and locally on a user's computing system 400. Alternatively, the image processing application may be served to a user's computing system 400 via a network (e.g., local area network and Internet) such as network 460 and a remote server configured to host a service that embodies or otherwise employs the image processing techniques provided herein. In some such embodiments, some portion of the image processing application may be executed on the server while other portions may be executed via processor 410 by way of executable modules served to a browser of the user's computing system 400, as will be apparent in light of this disclosure.

Radio 418 may include one or more radios capable of transmitting and receiving signals using various suitable wireless communications techniques. Such techniques may involve communications across one or more wireless networks (e.g., included in network 460). Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In some embodiments, display 420 may comprise any television or computer type monitor or display. Display 420 may comprise, for example, a liquid crystal display (LCD) screen, electrophoretic display (EPD or liquid paper display, flat panel display, touch screen display, television-like device, and/or a television. Display 420 may be digital and/or analog. In some embodiments, display 420 may be a holographic or three-dimensional display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display a user interface 422 on display 420.

In some embodiments, content services device(s) 430 may be hosted by any national, international and/or independent service (e.g., one or more remote servers configured to provide content such as video, still images, and/or image processing applications having functionalities as provided herein) and thus accessible to platform 402 via the Internet and/or other network 460, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420. In some embodiments, content services device(s) 430 may comprise a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, graphics, text, medical and gaming content, and so forth.

Content services device(s) 430 receives content such as cable television programming including media information, digital information, and/or other online content (e.g., videos, still image sequences, etc). Examples of content providers may include any cable or satellite television or radio or Internet content providers. In one such example embodiment, an image processing application or service configured as provided herein is accessible to the user's computing system 400 via an Internet content provider accessible by network 460. As previously explained, such a service may provide execution of the image processing application on the server side based on inputs (e.g., selection 104 and any other inputs to engage the service) received from the so-called client side (user's computing system 400). Alternatively, the service may provide executable code embodying the entire image processing application to the client side computing system 400. For instance, the service may serve one or more web pages having a suitable user interface and code embedded therein to a browser application running on computing system 400 and configured to effectively execute that code in conjunction with the processor 410. The browser may be included, for example, in applications 416. In still other embodiments, some of the image application may execute on the server side and other portions may execute on the client side. Numerous such client-server configurations will be apparent. The provided examples are not meant to limit the present disclosure. In some embodiments, platform 402 may receive control signals from navigation controller 450 having one or more navigation features. The navigation features of controller 450 may be used to interact with user interface 422, for example. In some embodiments, navigation controller 450 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures or sounds or voice commands.

Movements of the navigation features of controller 450 may be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In some embodiments, controller 450 may not be a separate component but integrated into platform 402 and/or display 420. Embodiments, however, are not limited to the elements or in the context shown or described herein, as will be appreciated.

In some embodiments, drivers (not shown) may comprise technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 when the platform is turned "off." In addition, chip set 405 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the present disclosure.

In various embodiments, system 400 may be implemented as a wireless system, a wired system, or a combination of both. When implemented as a wireless system, system 400 may include components and interfaces suitable for communicating over a wireless shared media, such as one or more antennas 404, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using the interactive features for video described herein). The embodiments, however, are not limited to the elements or context shown or described in FIG. 4.

Figure 5:
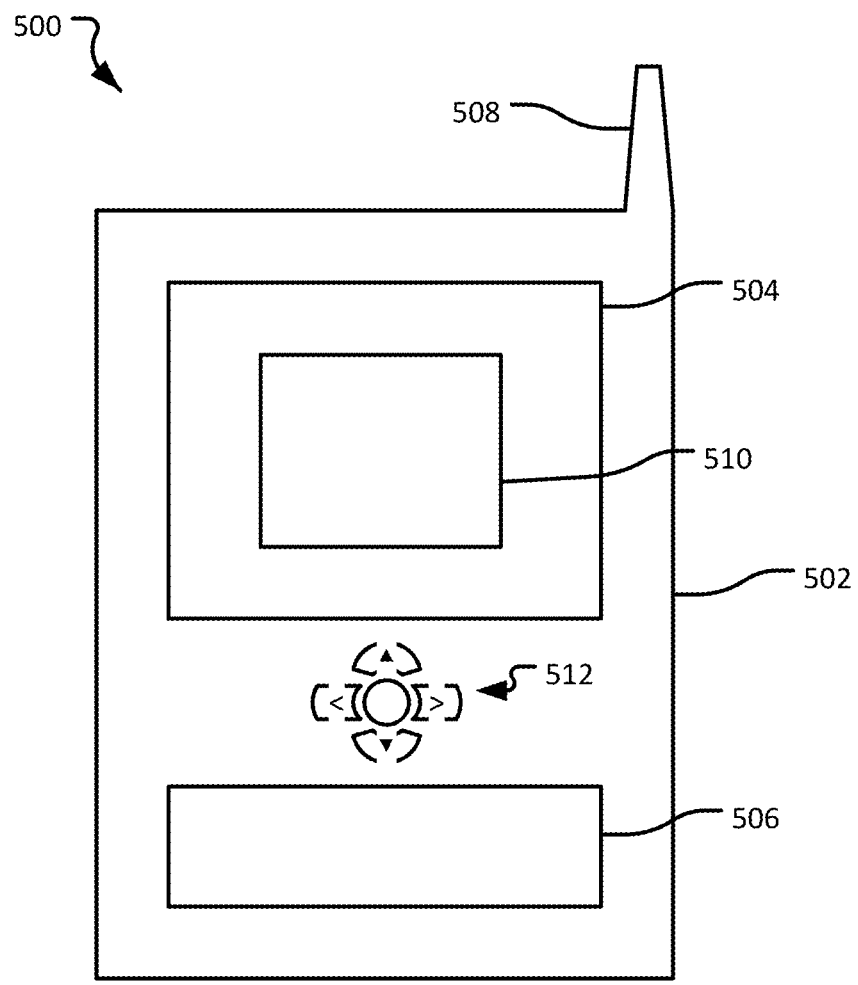
FIG. 5 illustrates embodiments of a small form factor device in which the system of FIG. 4 may be embodied.

As described above, system 400 may be embodied in varying physical styles or form factors. FIG. 5 illustrates embodiments of a small form factor device 500 in which system 400 may be embodied. In some embodiments, for example, device 500 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may comprise a housing 502, a display 504, an input/output (I/O) device 506, and an antenna 508. Device 500 also may comprise navigation features 512. Display 504 may comprise any suitable display unit for displaying information appropriate for a mobile computing device. I/O device 506 may comprise any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article or computer program product which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article or computer program product may include, for example, any suitable type of non-transient memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language. Some embodiments may be implemented in a computer program product that incorporates the functionality of the techniques for adding interactive features to video as variously disclosed herein, and such a computer program product may include one or more machine-readable mediums.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Further Example Embodiments

The following examples pertain to further embodiments, from which numerous permutations and configurations will be apparent.

Example 1 is a method comprising: segmenting each frame of a video into its semantic components to identify one or more subjects within each frame scene based on a respective group of pixels, wherein the video is a part of media; receiving a selection of one or more subjects within a given frame scene; tracking the one or more subjects from frame to frame of the video to identify the respective group of pixels comprising the one or more subjects in each frame; and alpha-matting the media to isolate the one or more selected subjects from frame to frame.

Example 2 includes the subject matter of Example 1, wherein alpha-matting the media comprises: forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played; or forming a transparency matte around the one or more selected subjects in each frame to allow playing the video by copying the one or more selected subjects in the frame being played on top of the given frame scene.

Example 3 includes the subject matter of either Example 1 or 2, wherein segmenting each frame of the video is performed using an unattended graph cut method.

Example 4 includes the subject matter of any of the preceding Examples, further comprising pixel depth information to improve segmenting to identify one or more subjects within each frame.

Example 5 includes the subject matter of Example 4, further comprising generating the pixel depth information using a stereo or array camera.

Example 6 includes the subject matter of any of the preceding Examples, further comprising receiving the selection of the one or more subjects from a user.

Example 7 includes the subject matter of Example 6, further comprising receiving the user selection from a click or tap input performed on the one or more subjects in the given frame.

Example 8 includes the subject matter of any Examples 1-7, further comprising receiving the selection of the one or more subjects prior to segmenting each frame, wherein only the selected one or more subjects are segmented.

Example 9 includes the subject matter of any of Examples 1-7, further comprising tracking the one or more subjects prior to receiving a selection of one or more of the tracked subjects.

Example 10 includes the subject matter of any of Examples 1-9, further comprising generating a still image, wherein the one or more selected subjects are from different frames than the given frame.

Example 11 includes the subject matter of any of Examples 1-9, further comprising generating a video, wherein the one or more selected subjects are started out of sequence relative to the given frame.

Example 12 includes the subject matter of any of Examples 1-9, further comprising generating a visual media, wherein only the one or more selected subjects are playing while the remaining portion of the given frame is still.

Example 13 includes the subject matter of any of Examples 1-9, further comprising generating a visual media, wherein one or more subjects in a specific frame of the video can be selected to animate the selected one or more subjects relative to the remainder of the specific frame.

Example 14 is a mobile computing system configured to perform the method of any of the preceding Examples.

Example 15 is a computing device comprising: a processor; memory accessible by the processor; and an application stored on the memory and executable by the processor, the application configured to: segment each frame of a video into its semantic components to identify one or more subjects within each frame scene based on a respective group of pixels, wherein the video is a part of media; receive a selection of one or more subjects within a given frame scene; track the one or more subjects from frame to frame of the video to identify the respective group of pixels comprising the one or more subjects in each frame; and alpha-matte the media to isolate the one or more selected subjects from frame to frame.

Example 16 includes the subject matter of Example 15, wherein alpha-matte the media comprises: forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played; or forming a transparency matte around the one or more selected subjects in each frame to allow playing the video by copying the one or more selected subjects in the frame being played on top of the given frame scene.

Example 17 includes the subject matter of either of Examples 15 or 16, further comprising a display operatively coupled to the processor and at least one input device operatively coupled to the processor, wherein a user can use the at least one input device to select the one or more subjects within a given frame scene.

Example 18 includes the subject matter of either of Examples 15 or 16, further comprising a touch screen display coupled to the processor, wherein the touch screen is configured to receive the selection of the one or more subjects from user input.

Example 19 is at least one computer program product encoded with instructions that, when executed by one or more processors, causes a process for adding interactive features to video to be carried out, the process comprising: segmenting each frame of a video into its semantic components to identify one or more subjects within each frame scene based on a respective group of pixels, wherein the video is a part of media; receiving a selection of one or more subjects within a given frame scene; tracking the one or more subjects from frame to frame of the video to identify the respective group of pixels comprising the one or more subjects in each frame; and alpha-matting the media to isolate the one or more selected subjects from frame to frame.

Example 20 includes the subject matter of Example 19, wherein alpha-matting the media comprises: forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played; or forming a transparency matte around the one or more selected subjects in each frame to allow playing the video by copying the one or more selected subjects in the frame being played on top of the given frame scene.

Example 21 includes the subject matter of either Example 19 or 20, wherein segmenting each frame of the video is performed using an unattended graph cut method.

Example 22 includes the subject matter of any of Examples 19-21, further comprising pixel depth information to improve segmenting to identify one or more subjects within each frame.

Example 23 includes the subject matter of Example 22, further comprising generating the pixel depth information using a stereo or array camera.

Example 24 includes the subject matter of any of Examples 19-23, further comprising receiving the selection of the one or more subjects from a user.

Example 25 includes the subject matter of Example 24, further comprising receiving the user selection from a click or tap input performed on the one or more subjects in the given frame.

Example 26 includes the subject matter of any of Examples 19-25, further comprising receiving the selection of the one or more subjects prior to segmenting each frame, wherein only the selected one or more subjects are segmented.

Example 27 includes the subject matter of any of Examples 19-25, further comprising tracking the one or more subjects prior to receiving a selection of one or more of the tracked subjects.

Example 28 includes the subject matter of any of Examples 19-27, further comprising generating a still image, wherein the one or more selected subjects are from different frames than the given frame.

Example 29 includes the subject matter of any of Examples 19-27, further comprising generating a video, wherein the one or more selected subjects are started out of sequence relative to the given frame.

Example 30 includes the subject matter of any of Examples 19-27, further comprising generating a visual media, wherein only the one or more selected subjects are playing while the remaining portion of the given frame is still.

Example 31 includes the subject matter of any of Examples 19-27, further comprising generating a visual media, wherein one or more subjects in a specific frame of the video can be selected to animate the selected one or more subjects relative to the remainder of the specific frame.

Example 32 is a mobile computing system configured to run the at least one computer program product of any of Examples 18-31.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method comprising:
   segmenting each frame of a video into its semantic components to identify one or more subjects within each frame scene based on a respective group of pixels, wherein the video is a part of media;
   receiving a selection of one or more subjects within a given frame scene;
   tracking the one or more subjects from frame to frame of the video to identify the respective group of pixels comprising the one or more subjects in each frame; and
   alpha-matting the media to isolate the one or more selected subjects from frame to frame.

2. The method of claim 1 wherein alpha-matting the media comprises:
   forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played; or
   forming a transparency matte around the one or more selected subjects in each frame to allow playing the video by copying the one or more selected subjects in the frame being played on top of the given frame scene.

3. The method of claim 1 wherein segmenting each frame of the video is performed using an unattended graph cut method.

4. The method of claim 1, further comprising pixel depth information to improve segmenting to identify one or more subjects within each frame.

5. The method of claim 4, further comprising generating the pixel depth information using a stereo or array camera.

6. The method of claim 1, further comprising receiving the selection of the one or more subjects from a user.

7. The method of claim 6, further comprising receiving the user selection from a click or tap input performed on the one or more subjects in the given frame.

8. The method of claim 1, further comprising receiving the selection of the one or more subjects prior to segmenting each frame, wherein only the selected one or more subjects are segmented.

9. The method of claim 1, further comprising tracking the one or more subjects prior to receiving a selection of one or more of the tracked subjects.

10. The method of claim 1, further comprising generating a still image, wherein the one or more selected subjects are from different frames than the given frame.

11. The method of claim 1, further comprising generating a video, wherein the one or more selected subjects are started out of sequence relative to the given frame.

12. The method of claim 1, further comprising generating a visual media, wherein only the one or more selected subjects are playing while the remaining portion of the given frame is still.

13. The method of claim 1, further comprising generating a visual media, wherein one or more subjects in a specific frame of the video can be selected to animate the selected one or more subjects relative to the remainder of the specific frame.

14. A computing device comprising:
   a processor;
   memory accessible by the processor; and
   an application stored on the memory and executable by the processor, the application configured to:
      segment each frame of a video into its semantic components to identify one or more subjects within each frame scene based on a respective group of pixels, wherein the video is a part of media;
      receive a selection of one or more subjects within a given frame scene;
      track the one or more subjects from frame to frame of the video to identify the respective group of pixels comprising the one or more subjects in each frame; and
      alpha-matte the media to isolate the one or more selected subjects from frame to frame.

15. The device of claim 14 wherein alpha-matte the media comprises:
   forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played; or
   forming a transparency matte around the one or more selected subjects in each frame to allow playing the video by copying the one or more selected subjects in the frame being played on top of the given frame scene.

16. The device of claim 14, further comprising a display operatively coupled to the processor and at least one input device operatively coupled to the processor, wherein a user can use the at least one input device to select the one or more subjects within a given frame scene.

17. The device of claim 14, further comprising a touch screen display coupled to the processor, wherein the touch screen is configured to receive the selection of the one or more subjects from user input.

18. At least one non-transitory computer program product encoded with instructions that, when executed by one or more processors, causes a process for adding interactive features to video to be carried out, the process comprising:
   segmenting each frame of a video into its semantic components to identify one or more subjects within each frame scene based on a respective group of pixels, wherein the video is a part of media;
   receiving a selection of one or more subjects within a given frame scene;
   tracking the one or more subjects from frame to frame of the video to identify the respective group of pixels comprising the one or more subjects in each frame; and
   alpha-matting the media to isolate the one or more selected subjects from frame to frame.

19. The at least one computer program product of claim 18 wherein alpha-matting the media comprises:
   forming a transparency matte matching the shape of the one or more selected subjects from the given frame scene to allow playing the video through one or more holes created by the transparency matte, wherein the shape of the one or more holes in the given scene is updated for each frame of the video to match the shape of the one or more selected subjects in the frame being played; or
   forming a transparency matte around the one or more selected subjects in each frame to allow playing the video by copying the one or more selected subjects in the frame being played on top of the given frame scene.

20. The at least one computer program product of claim 18, further comprising receiving the selection of the one or more subjects from a user.

21. The at least one computer program product of claim 18, further comprising tracking the one or more subjects prior to receiving a selection of one or more of the tracked subjects.

22. The at least one computer program product of claim 18, further comprising generating a still image, wherein the one or more selected subjects are from different frames than the given frame.

23. The at least one computer program product of claim 18, further comprising generating a video, wherein the one or more selected subjects are started out of sequence relative to the given frame.

24. The at least one computer program product of claim 18, further comprising generating a visual media, wherein only the one or more selected subjects are playing while the remaining portion of the given frame is still.

25. The at least one computer program product of claim 18, further comprising generating a visual media, wherein one or more subjects in a specific frame of the video can be selected to animate the selected one or more subjects relative to the remainder of the specific frame.

\* \* \* \* \*